United States Patent [19]

Strong-Grainger

[11] Patent Number: 4,805,201
[45] Date of Patent: Feb. 14, 1989

[54] INTRAORAL DENTAL RADIOGRAPHIC FILM PACKET PAD

[76] Inventor: Vonda Strong-Grainger, E. 3730 Zeus, Mead, Wash. 99021

[21] Appl. No.: 882,308

[22] Filed: Jul. 7, 1986

Related U.S. Application Data

[62] Division of Ser. No. 725,765, Apr. 22, 1985, Pat. No. 4,626,216.

[51] Int. Cl.⁴ .............................................. A61B 6/14
[52] U.S. Cl. ..................................... 378/169; 378/168
[58] Field of Search ........................ 378/168, 169, 170

[56] References Cited

U.S. PATENT DOCUMENTS

| | | | |
|---|---|---|---|
| 1,537,925 | 5/1925 | Bolin | 378/169 |
| 1,631,497 | 6/1927 | Marler | 378/169 |
| 1,698,795 | 1/1929 | Hillman | 378/168 |
| 1,994,579 | 3/1935 | Hodgson | 378/169 |
| 2,010,281 | 8/1935 | Van Valkenburg | 378/168 |
| 2,084,092 | 6/1937 | Kenney | 378/168 |
| 3,444,371 | 5/1969 | Via, Jr. | 378/168 |
| 4,128,950 | 12/1978 | Bowerman et al. | 36/30 R |

OTHER PUBLICATIONS

Letter from Dr. Timothy W. Anderson dated 8-21-85.
Letter from Dr. Timothy W. Anderson dated 10-7-85.
"Certified Mail", cover sheet dated May 7, 1981, 2 Evaluation Sheets from Marquette University.
Chicago Dental Society letter dated Nov. 1981.
Chicago Dental Society letter dated Jan. 1982.
Chicago Dental Society Program title page dated Feb. 21 through 24, 1982.
Pages 140, (partial) and 141 of a booklet assumed to be from Chiacgo Dental Society "program", bearing no date.
3 photos, 1 including 12-1981 film carton cover and paper sheet with "Fasson" heading bearing unidentifiable date but assumed to be 4-30-70.

Primary Examiner—Bruce C. Anderson
Assistant Examiner—T. N. Grigsby
Attorney, Agent, or Firm—Wells, St. John & Roberts

[57] ABSTRACT

Padding for a radiographic film packet may be formed of a foamed ethylene vinyl acetate and supplied as a portion of the film packet or as a pad for attachment to an existing film packet. The pad extends along an edge surface on the film packet to relieve discomfort and to facilitate positioning of the pad and film packet within the patient's mouth for accurate exposure to X-rays. The side of the packet opposite the pad is allowed to remain unpadded for the following reasons; to avoid increasing the overall packet dimensions, to facilitate relatively free access to the film contents of the packet, and to enable the film packet to fit into film holders that are currently used for film placement. The padded film packet is especially useful in periapical films where it is especially desirable to expose root areas and adjacent tissues.

7 Claims, 2 Drawing Sheets

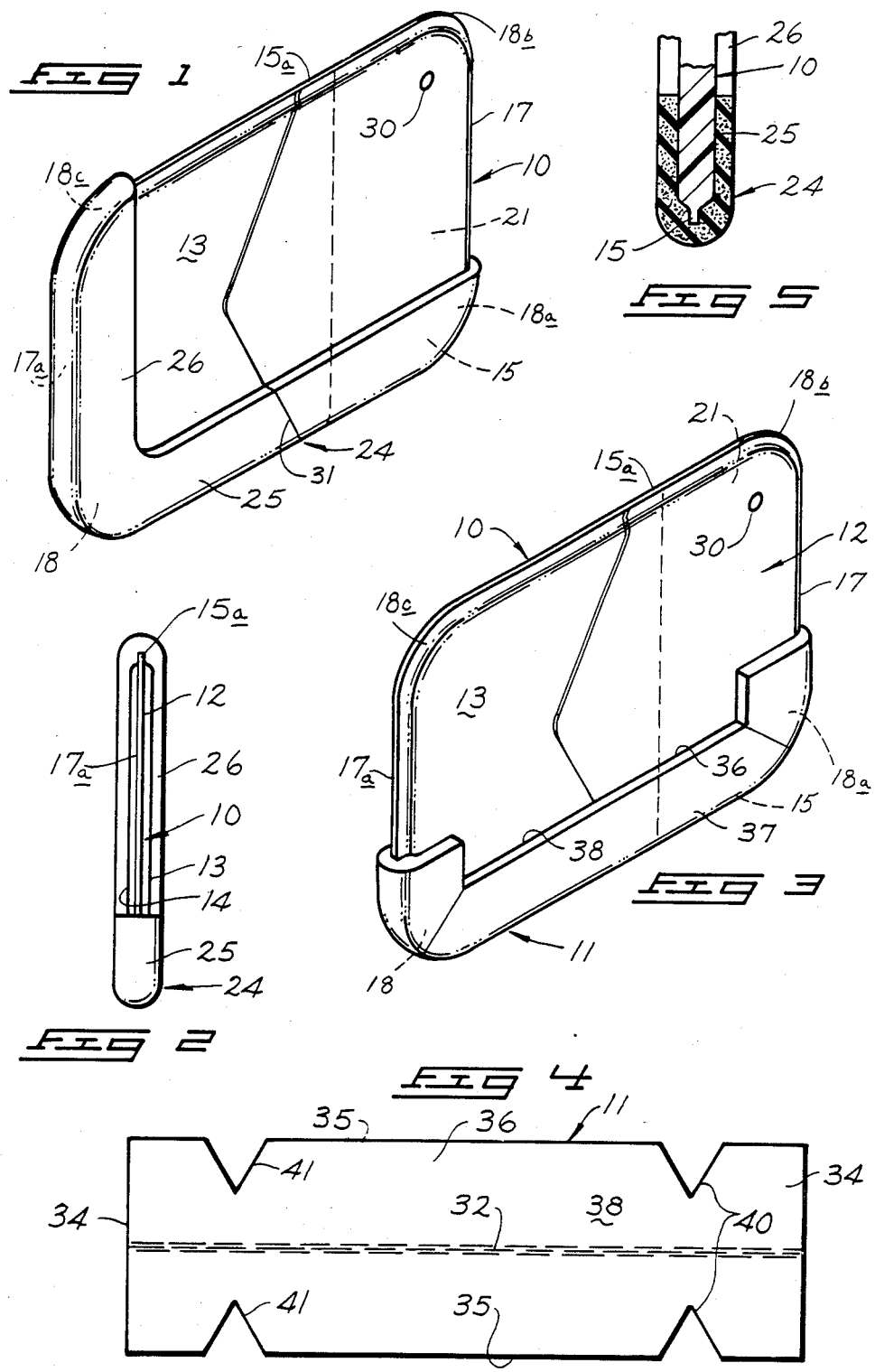

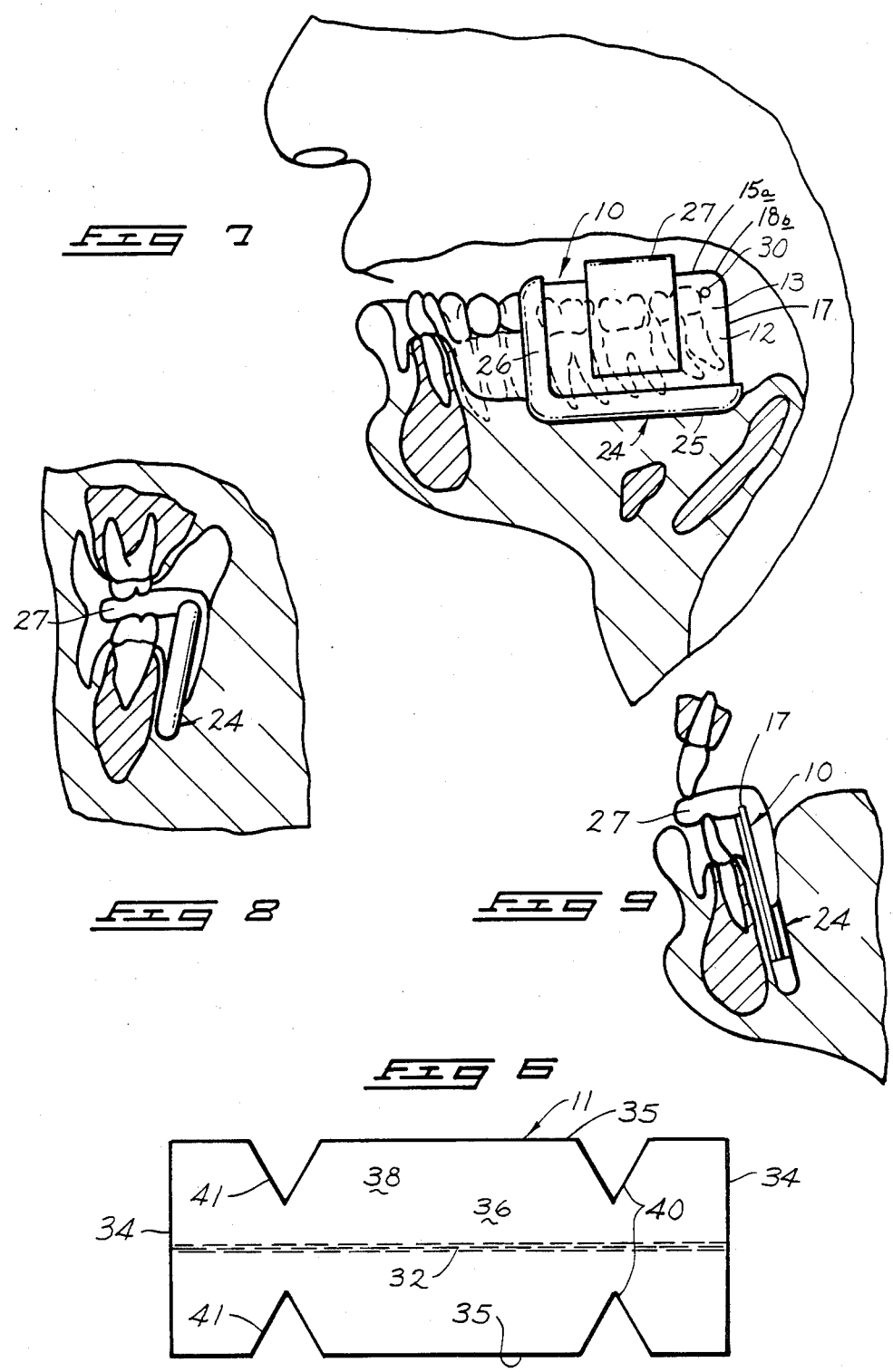

INTRAORAL DENTAL RADIOGRAPHIC FILM PACKET PAD

This application is a division of U.S. patent application Ser. No. 725,765 filed Apr. 22, 1985 and now U.S. Pat. No. 4,626,216.

FIELD OF THE INVENTION

The present invention relates to padding intraoral film packets. The purpose of this is to increase patient comfort and facilitate positioning of the film packet within the patient's mouth in order to achieve optimal exposure of the teeth and adjacent tissues.

BACKGROUND OF THE INVENTION

The predominant use of the "paralleling" technique in dental radiography results in low distortion exposures if the film packet can be properly placed within the patient's oral cavity. For periapical radiographs, the film placement must be sufficient to enable an exposure of the entire tooth including the crown and root and as much of the tissues surrounding the root as possible. This requirement, coupled with the need to maintain the film in a plane parallel to the long axis of the teeth, causes significant problems. There are currently two types of film packets. One type consists of a stiff cardboard-like paper packet. Another is a plastic packet which is heat sealed around its perimeter. This seal provides a thinner, more flexible edge. However, the plastic edge is even more sharp than that of the paper packet. Both forms therefore cause discomfort and often fairly intense pain when pressed into tissues by a dental operator attempting to obtain an adequate exposure. This is particularly difficult with children, adults with small mouths, and adults who exhibit sensitive bony projections off of the inside of the mandible and the hard palate, known as tori. It is especially difficult when the patient is required to cooperate in holding the film packet in the desired position by biting firmly on a film holder. Children will often not cooperate due to the pain and discomfort caused from the film packet. However, if the film packet is allowed to shift within the patient's mouth to a more "comfortable" position, or if the patient will only bite until the film meets resistance with his soft tissue, the quality of the resulting radiograph will be adversely effected.

This problem has not, to the knowledge of the present applicant, been adequately solved until advent of the present invention.

Pads for radiographic film have been disclosed in prior patents. For example, U.S. Pat. No. 1,995,579 to M. B. Hodgson discloses an X-ray dental film package that includes an absorbent pad structure attached to one surface of the film package and extends across the surface to a perimeter enclosing the entire perimeter of the film packet. The problem of discomfort was therefore recognized by Hodgson. However, the solution disclosed, while adequate for some purposes, added a considerable amount of bulk to the film package and therefore added to the difficulty in obtaining properly exposed radiographs. It is noted also that the "bisecting" method of obtaining radiographs was then in popular use. This technique allowed placement of the film packets at more comfortable angular orientations within the patient's mouth. The Hodgson package may therefore have functioned adequately with this particular radiographic technique, but cannot be adequately used with the currently more popular diagnostically accurate "paralleling technique". This is due primarily to the fact that the absorbent pad increases the overall thickness of the film package considerably and the peripheral rim extends the overall packet dimensions also by a considerable amount. Furthermore, the pad is constructed of "pressed absorbent cotton". This material will increase comfort to the patient but will not compress significantly when pressed against the soft tissues of the sublingual mucosa below the patient's tongue or the hard or soft palate above the tongue.

U.S. Pat. No. 1,537,925 to Bolin discloses a dental X-ray film package. Here, the package itself has been modified to include a yieldable package having a thick perimeter "bead". The pack is formed of an elastic rubber and the peripheral "beading" extends about the entire film perimeter. This package, like the Hodgson arrangement, includes an overall length and width dimension substantially greater than the actual film size. This results in problems similar to those discussed above.

A partial solution to the film packet size problem is recognized in U.S. Pat. No. 1,631,497 to Marler. Marler discloses a resilient bead arrangement for encasing the perimeter of a film packet. The improvement is in the elimination of an additional surface formed integral with the bead as shown in Bolin and Hodgson. Marler, however, continues use of the bead extending about the entire package periphery.

U.S. Pat. No. 2,084,092 to Kenney discloses a dental film holder. This holder is provided primarily for the purpose of providing a "bite wing" for gripping between the patient's teeth to produce "bite wing" exposures. This is a form of exposure often used for detecting interproximal caries. Bite wing X-rays do not require exposure of the root tips and surrounding tissues as with periapical exposures. The holder is formed of a resilient material with corner pockets to receive adjacent corners of the film packet. All four corners of the film packet are received within adjacent pockets of the holder which thereby increase the overall film packet size. Furthermore, sections of the sharp film packet edges are left exposed and can engage tissues to cause discomfort during exposure.

The problem of affording adequate padding along the relatively sharp edges of intraoral radiographic film packets has remained, until advent of the present invention. The present invention can be utilized to cushion the engaged tissues of the patient against the sharp edges of a film packet while maintaining a minimal overall film dimension. These two features enable very accurate and complete exposures using the paralleling technique while also maximizing patient comfort.

BRIEF DESCRIPTION OF THE DRAWINGS

Preferred forms of the present invention are illustrated in the accompanying drawings, in which:

FIG. 1 is a pictorial view of a film packet and pad combination illustrating features of the present invention;

FIG. 2 is an end view of the arrangement shown in FIG. 1;

FIG. 3 is a pictorial view of an existing film pack with a pad attachment mounted thereto;

FIG. 4 is a flat pattern view of an attachable pad similar to that shown in FIG. 3;

FIG. 5 is a view similar to FIG. 4 only showing a pad for attachment over an end of a film packet;

FIG. 6 is an enlarged sectional view taken through a film pack and the present pad;

FIG. 7 is a diagrammatic right mandibular sagital view illustrating placement of the film packet and present pad arrangement within a patient mouth;

FIG. 8 is a frontal view of the arrangement shown in FIG. 7 with the film packet held in place via a film holder; and FIG. 9 is a diagrammatic view illustrating the present pad and film packet with a film holder placed at the forward portion of the mandibular arch for a "central-lateral" exposure.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

There are two forms of the present invention illustrated in the accompanying drawings. FIG. 1 illustrates a combined radiographic film packet and pad arrangement embodying one form of the present invention. Another form is illustrated in FIGS. 3 through 5. This form constitutes a pad specially adapted to be secured to existing forms of intraoral radiographic film packets. Both forms of the present invention serve the same goal of increasing patient comfort during exposure of the film and facilitating placement of the film within the patient's mouth at such positions that will yield the optimum quality exposure.

The combined film packet and pad are designated in the accompanying drawings by the reference numeral 10. Numeral 11 is assigned the attachable pad, which is mountable to an existing, commercially available form of film packet 12 (FIG. 3). The film envelope portions of the film packet and pad 10 and the existing form of film packet 12 partially shown in FIG. 2 are very similar. Like features will therefore be referred to with similar reference characters to avoid confusion and redundancy.

The film packets 10 and 12 will each include a light-tight film-receiving envelope. The envelope will include a lingual surface 13 and an opposed labial surface 14. These surfaces are substantially parallel and planar to cover the enclosed film, paper and metal backing and to avoid exposure to light. The two surfaces 13 and 14 are joined together along substantially parallel first and second longitudinal edges 15a. Opposed ends of the envelope are defined by substantially parallel first and second transverse end edges 17. First through fourth rounded corners 18, 18a, 18b, and 18c join the parallel side and end edges. The edges 15 and 17 define the perimeter of the film envelope.

A cover flap 20 may be provided on the lingual surface 13. The cover flap 20 is used to selectively cover a film access opening 21 typically formed through the lingual surface 13 and under the flap to enable access to the film contents of the envelope. The cover flap 20 and access opening 21 ordinarily extend transversely across the film packet envelope. However, longitudinal flaps and access openings could be provided.

Existing, commercially available packet envelopes are typically formed of either a stiff cardboard type paper or a fairly flexible plastic material. The cardboard packets are fairly rigid and very uncomfortable to the patient. The plastic material is flexible and somewhat resilient but the joined edges 15, 15a and 17, 17a feel very sharp to the patient when they are pressed into the tissues of the mouth in preparation for exposure of the enclosed film. The present combined pad and packet, and attachment pad forms may utilize either cardboard or plastic envelopes since the attached pad 24 will present a softer surface for engagement with the sensitive tissues while facilitating relatively free placement of the film within the patient's mouth.

The present film packet and pad assembly 10 may include a substantially "L"-shaped pad 24. Pad 24 includes a longitudinal leg section 25 extending along and overlapping one of the longitudinal edges, preferably the first longitudinal edge 15 and the first and second corners 18, 18a of the film packet envelope. The transverse foot or transverse end section 26 of the "L" configuration will extend up one of the transverse end edges, preferably the first end edge 17 and overlapping the adjacent third corner 18b. The longitudinal and transverse pad sections may also overlap both opposed lingual and labial envelope surfaces.

The pad 24 may be attached to or otherwise secured to the envelope during construction of the film packet. The resulting product will therefore be a combined film packet and pad sold ready-for-use. In the combination, the longitudinal pad section 25 will facilitate positioning of the packet 10 at any position within the patient's mouth for bite wing or periapical exposures. Specifically, the film packet may be positioned with the longitudinal pad section pressed into the sublingual mucosa for "premolar", "molar", and "distal oblique" exposures.

The pad 24 will allow the film packet to be mounted, for example, to a film holder 27 such as that shown in U.S. Pat. No. 3,444,371. The holder can be gripped between the patient's teeth to hold the packet firmly in place without causing excessive discomfort or injury. The film packet can be accurately placed and held in position with the labial surface of the film packet facing the teeth such that the occlusal surfaces of the teeth are very close to the elevation of the top edge of the film packet. The roots of the teeth and surrounding tissues will therefore be adequately exposed on the film surface for a complete and accurate periapical exposure.

The same procedure is followed for maxillary exposures. The film packet may be turned with the pad engaging the hard or soft palate (depending upon the exposure required). The pad will avoid discomfort or injury to the palatal tissues while affording an accurate positioning of the film for exposure.

The longitudinal pad section can also be used in conjunction with existing forms of "bite wings" (not shown). A commercially available "bite wing" may be attached as a flange to the labial surface of the film pack and placed between the occlusal surfaces of the teeth for "bite wing" exposures. Here, the longitudinal pad will continue to serve in reducing patient discomfort.

The transverse or foot section 26 of the pad 24 may be used primarily for anterior periapicals (FIG. 9) and vertical bite wings. Here the pad serves basically the same function as the longitudinal pad leg 25 in preventing discomfort and facilitating placement.

It is noted that the second side edge 15a and the second transverse end 17a, and the fourth rounded corner 18d opposite the L-shaped pad remain uncovered. This is important for several reasons. Firstly, these surfaces remain uncovered to reduce the overall dimensions of the film packet. Thus, the pads are used most advantageously to reduce discomfort while the overall size of the packet remains at a minimum. This facilitates placement of the packet in positions that would otherwise be very difficult to attain. Secondly, the uncovered edges will allow the film to be placed in holders 27 currently used for film placement. Additionally, the position of the L-shaped pad arrangement does not result in coverage of the circular "occlusal dot" 30. The dot 30 is used as an indicator to remind the dental operator or assistant placing the film to keep the proper (labial) side of the packet facing the tube of the X-ray machine. The dot is also used to indicate the orientation of the exposure. Another reason for this arrangement is to facilitate access to the film through the cover flap 20 and film access opening 21. The pad may be provided with a slit, shown as a line 31 in FIG. 1, directly over the underlying cover flap edge to facilitate hinged movement of the flap to an open condition. The envelope interior will therefore remain freely accessible.

Two forms of the attachment pad 11 are shown in FIGS. 4 and 5. The form shown in FIG. 4 is also shown in FIG. 2 attached to a longitudinal edge of an existing film packet 12. Attachment pads 11 are substantially rectangular, extending between opposed ends 34. The ends 34 are connected by substantially parallel side edges 35. A central fold or depression 32 is formed longitudinally between ends 34 for receiving an edge of the film packet 12. The depression indicates where the packet edge is to be placed when the pad is being secured to the pocket 12.

The pad ends 34 are spaced by a length dimension of the pad attachment that is at least equal to the dimension along one envelope end edge (between longitudinal edges 15 of a film packet envelope). This length assures that the entire engaged edge will be covered and adjacent labial and lingual pocket surfaces will be overlapped by the pad to protect engaged tissues of the patient's mouth.

The distance between the two sets of notches for the FIG. 4 version of the pad attachment 11 may be substantially equal to the length dimension of the associated longitudinal film packet envelope edge. The pad remaining beyond the tabs therefore forms that portion of the pad shown in FIG. 3 extending up the transverse edges. Similarly, the attachment pad shown in FIG. 6 includes a length dimension between notch pairs 40 and 41 that is substantially equal to the width dimension of the film packet envelope between the longitudinal side edges 15. The remaining length beyond the notches will therefore be used to extend partially along the longitudinal side edges, producing rounded corners that are not shown but are similar to those shown in FIG. 3.

The attachment pad 11 includes an inner surface 36 that includes the depression 32, and an outer surface 37. The surfaces 36 and 37 are spaced apart by a thickness dimension of the pad. It is preferred this thickness dimension be approximately 1.5 mm. This same thickness dimension is preferred also for the packet pad combination shown in FIG. 1.

It is also preferred that the inner surface 36 of the attachment pad be coated with an appropriate non-toxic adhesive 38 that will enable the pad to be firmly secured to the film packet envelope.

Each form of the attachment pad may include a first set of notches 40 adjacent one of the pad ends 34. The notches 40 enable folding of the pad to the configuration shown in FIG. 3 such that the adjacent pad end 34 will extend up the engaged end edge of the film packet envelope. Another set of notches 41 can be provided at the opposite pad end to facilitate a similar folding action of that end and engagement along the opposite end edge of the film packet envelope. The resulting configuration is shown in FIG. 3. The pad form shown in FIG. 6 will be similar to that shown in FIG. 3 only fitted along a selected end edge of the film packet envelope.

All forms of the present pad structure are preferably constructed of a resilient non-toxic material that is biocompatible with oral tissues. Ethylene vinyl acetate foam has been found to include such qualities and has been used with success. The spongy nature of the ethylene vinyl acetate (EVA) readily accepts pleasant flavorings that may distract from the unpleasant taste of the typical film packet envelope. Furthermore, EVA readily lends itself to coloring. Different pad and packet sizes can therefore be "color-coded".

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. An intraoral dental radiographic film packet, comprising:

an elongated light-tight envelope enclosing dental radiographic film and having a lingual surface and a labial surface joined together along first and second longitudinal edges and along first and second transverse end edges;

the packet further including a pad member having an elongated leg section extending along and overlapping substantially the full extent of one of the longitudinal edges and a substantially transverse foot section extending along and overlapping substantially the full extent of one of the transverse end edges the film packet further including means for being engaged by a conventional dental radiographic film holder;

wherein the pad member is formed of a resilient non-toxic material, biocompatible with oral tissue;

an access opening formed in the envelope and a transverse cover flap on the envelope for selectively covering the access opening said cover flap including an edge spaced from the access opening; and wherein one of the pad sections overlaps the cover flap and is separable along a slit directly over the underlying cover flap edge to facilitate movement of the cover flap to an open position permitting access to the access opening.

2. The intraoral film packet of claim 1 wherein the pad member is formed of foamed ethylene vinyl acetate.

3. The intraoral film packet of claim 1 wherein the pad sections project approximately 1.5 mm from at least one of said lingual or labial surfaces of the light tight envelope.

4. The intraoral film packet of claim 1 wherein the pad sections overlap both lingual and labial surfaces of the light tight envelope.

5. An intraoral dental radiographic film packet, comprising:

a substantially rectangular light-tight envelope for releasably enclosing dental radiographic film and having a first thickness dimension between a lingual surface and a labial surface the surfaces being joined together along substantially parallel longitudinal edges and substantially parallel transverse end edges;

corners joining the longitudinal edges with the transverse end edges;

the film packet further including a longitudinal resilient pad section extending along and overlapping substantially the full extent of one of the longitudinal envelope edges and the corners adjoining the same one longitudinal edge, and a substantially transverse pad section extending along and overlapping substantially the full extent of one of the envelope transverse end edges and the corners adjoining the same one transverse end edge, the pad sections defining an increased substantially consistent thickness dimension through the packet with reference to the first thickness dimension between the lingual and labial surfaces of the envelope;

the packet including means, along the remaining longitudinal edge, transverse end edge and the corner therebetween of the first thickness dimension, for enabling the lingual and labial surfaces of the light tight envelope to be engaged and gripped by a conventional dental radiographic film holder such as the kind including a slot for receiving one of the remaining edges and a bite portion extending outwardly of the slot; and wherein the pad sections are formed of a resilient nontoxic material, biocompatible with oral tissue.

6. An intraoral dental radiographic film packet, comprising:

a substantially rectangular light-tight envelope for releasably enclosing dental radiographic film and having a lingual surface and a labial surface joined to the lingual surface along first and second longitudinal edges and along first and second transverse end edges;

first and second corners joining the first longitudinal edge with the first and second transverse end edges, and third and fourth corners joining the second longitudinal edge with the first and second transverse end edges;

the film packet further including a longitudinal resilient pad section on at least one of the envelope surfaces and overlapping substantially the full extent of the first longitudinal edge and the first and second corners and a transverse resilient pad section on at least one of the envelope surfaces and overlapping substantially the full extent of the first transverse end edge and the third corner; the pad sections including a substantially consistent thickness dimension in relation to the thickness dimension of the envelope between lingual and labial surfaces;

the pad sections being formed of a resilient nontoxic material, biocompatible with oral tissue; and the envelope including exposed surface means, along the second longitudinal edge, the fourth corner, and the second transverse edge, for enabling the packet to be engaged and held by a conventional dental radiographic film holder and for reducing discomfort to a patient when the packet is positioned in the patient's mouth.

7. The intraoral dental radiographic film packet of claim 1, 5, or 6 further comprising occlusal dot means on the packet, spaced clear of the pad sections for indicating orientation of radiographic film enclosed within the packet.

* * * * *